United States Patent [19]

McCullough et al.

[11] Patent Number: 4,965,909
[45] Date of Patent: Oct. 30, 1990

[54] SAFETY CONTROL FOR POWER OPERATED EQUIPMENT

[76] Inventors: Timothy J. McCullough, 833 Aurora Rd., Vermillion, Ohio 44089; Giorgio Grasselli, Via L. Roversi No. 2, 42020 Albinea Re, Italy

[21] Appl. No.: 354,890

[22] Filed: May 19, 1989

Related U.S. Application Data

[63] Continuation-in-part of Ser. No. 253,114, Oct. 4, 1988, abandoned.

[51] Int. Cl.$^5$ .............................................. A22B 5/16
[52] U.S. Cl. ................................... 17/21; 17/50; 192/131 R
[58] Field of Search .......... 17/21, 50, 52; 192/130, 192/131 R; 2/2, 16, 20, 154

[56] References Cited

U.S. PATENT DOCUMENTS

| | | | |
|---|---|---|---|
| 721,270 | 2/1903 | Zeckendorf | 192/131 |
| 941,726 | 11/1909 | Pfalzgraf | 192/131 |
| 2,978,084 | 4/1961 | Vilkaitis | 192/131 |
| 3,011,610 | 12/1961 | Stiebel et al. | 192/131 |
| 3,047,116 | 7/1962 | Stieble et al. | 192/131 |
| 3,370,233 | 2/1968 | Morelock | 324/158 |
| 3,785,230 | 1/1974 | Lokey | 83/58 |
| 4,026,177 | 5/1977 | Lokey | 83/835 |
| 4,195,722 | 4/1980 | Anderson et al. | 192/131 |
| 4,321,841 | 3/1982 | Felix | 74/615 |
| 4,391,358 | 7/1983 | Heager | 192/130 |
| 4,621,300 | 11/1986 | Summerer | 361/175 |

FOREIGN PATENT DOCUMENTS

3501021A1  7/1985  Fed. Rep. of Germany .......... 17/21

*Primary Examiner*—Willis Little
*Attorney, Agent, or Firm*—Michael Sand Co.

[57] ABSTRACT

A safety control system for power operated equipment ensures operator safety by immediately disconnecting or reversing the power drive from a power driven rotating member such as a circular blade of a meat trimming knife or a toothed feed shaft of a meat skinning machine, upon a metal conductive glove worn by the operator, contacting the blade or toothed shaft or other electrically isolated portion of the equipment. The operator's glove is electrically connected to a safety switch which immediately disconnects or reverses the power drive from the rotating member upon the glove completing a circuit upon contact with the electrically isolated portion of the equipment. A moisture impervious dielectric plastic glove preferably is worn by the operator to prevent the moisture in the meat from conducting current between the metal glove and isolated machine portion until the plastic glove is cut and contact made with the metal glove. A switch requires manual actuation to connect the power drive to the rotatable member. The metal gloves are connected to the safety switch by electrodes secured to the operator's wrists in close proximity to the metal gloves. In a second embodiment the gloves are connected to the safety switch by a pair of metal electrodes mounted on the operator's garment adjacent the thigh areas which contact another pair of electrodes provided by a pair of pivotally mounted conductive arms which extend outwardly from the power operated equipment.

33 Claims, 7 Drawing Sheets

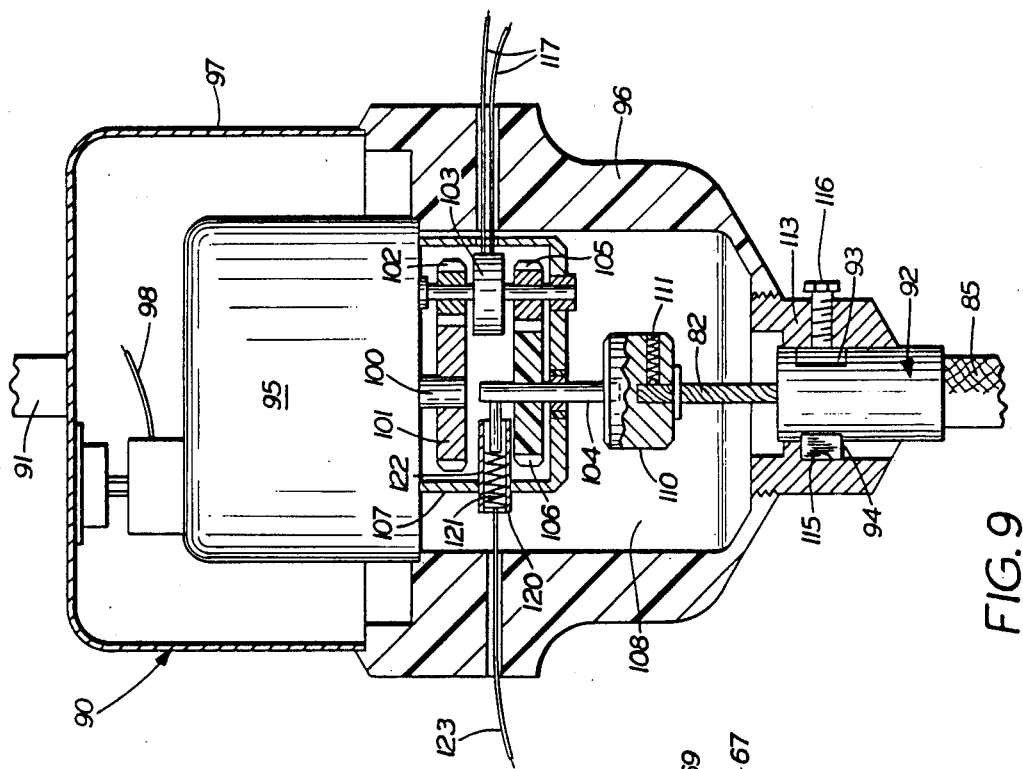
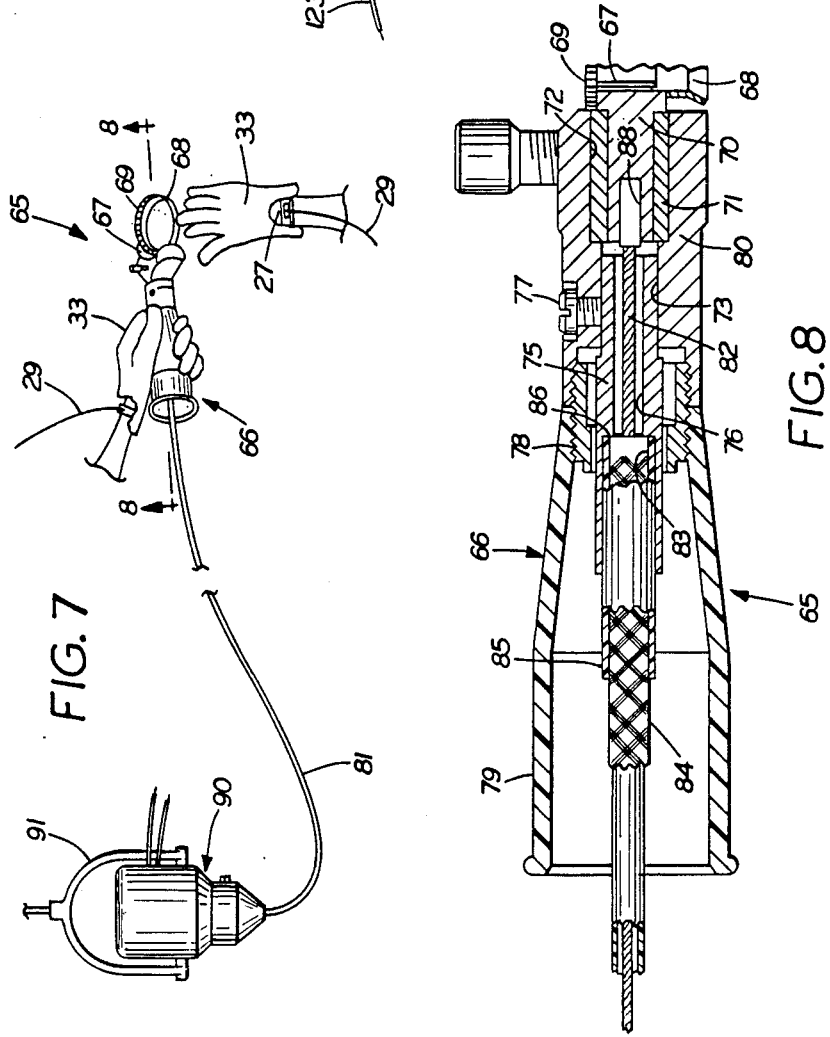
FIG. 9
FIG. 7
FIG. 8

U.S. Patent   Oct. 30, 1990   Sheet 5 of 7   4,965,909
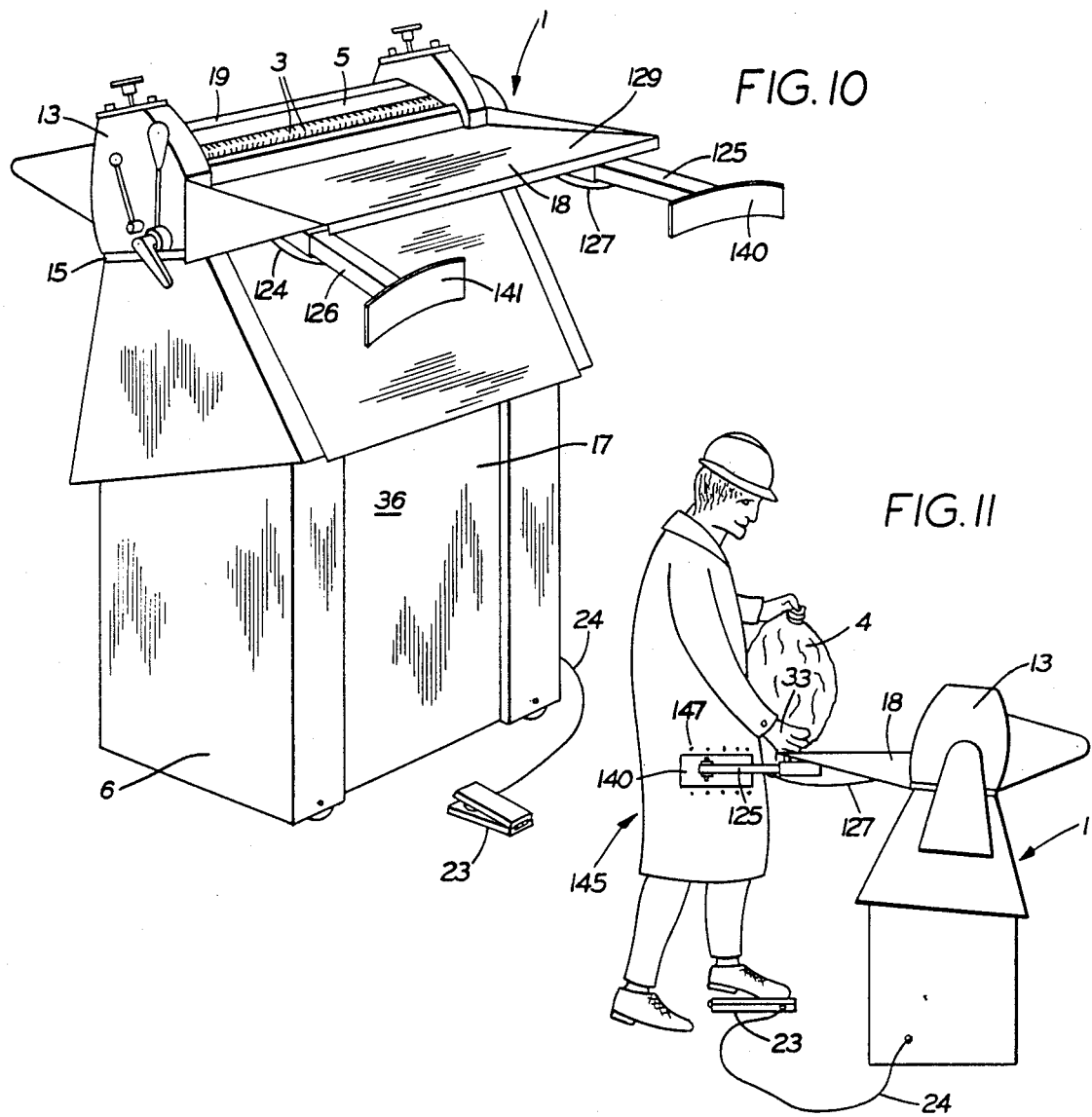
FIG. 10
FIG. 11
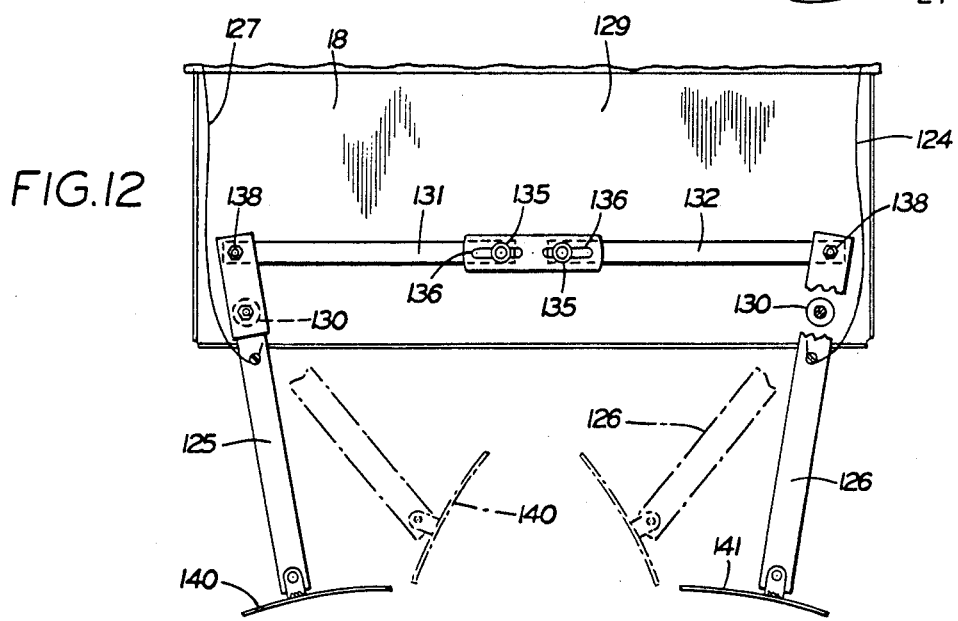
FIG. 12

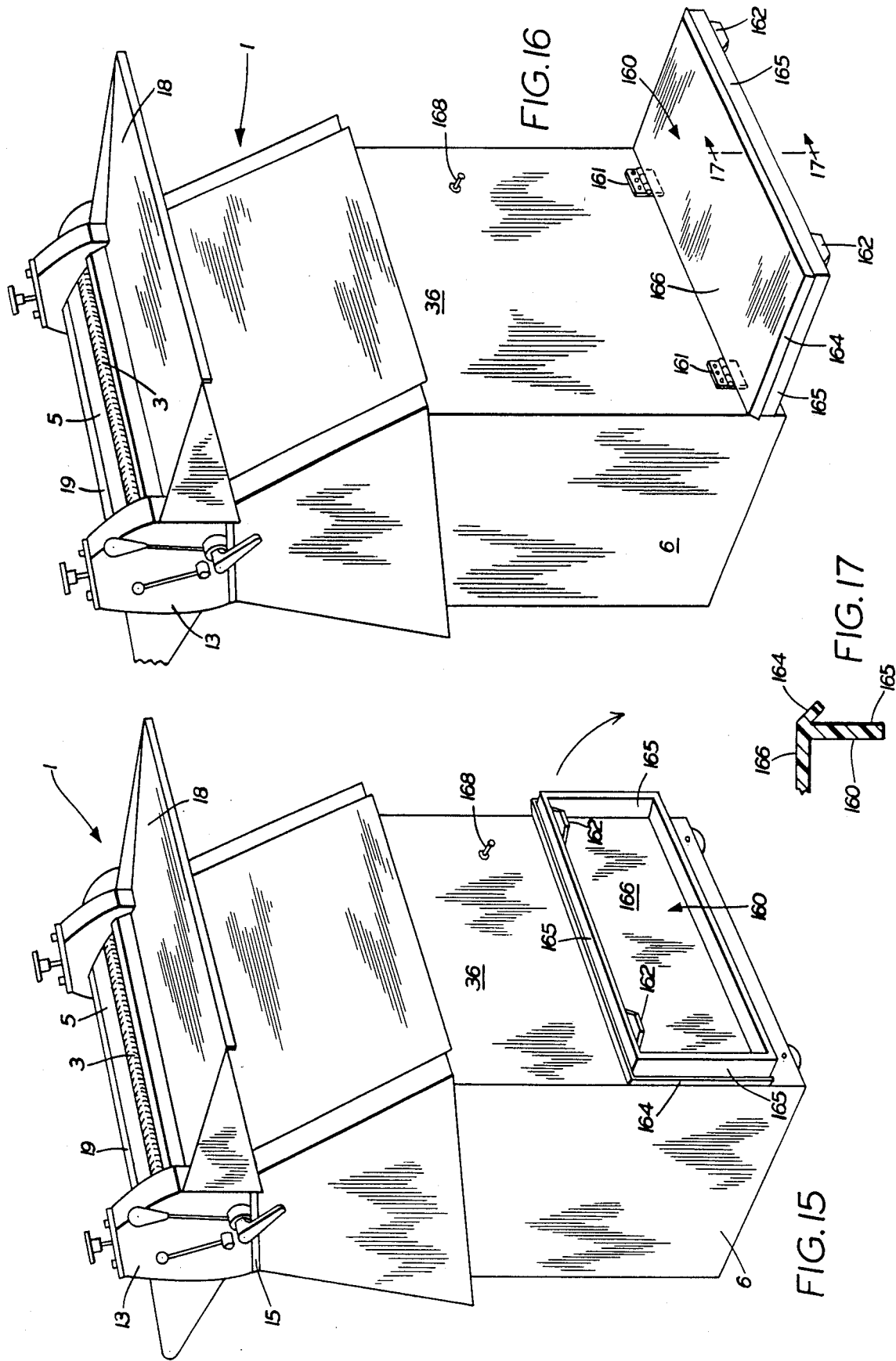

SAFETY CONTROL FOR POWER OPERATED EQUIPMENT

CROSS REFERENCE TO RELATED APPLICATION

The present application is a Continuation-In-Part of pending patent application Ser. No. 07/253,114 filed Oct. 04, 1988 now abandoned.

BACKGROUND OF THE INVENTION

1. Technical Field

The invention relates to a control system incorporated into machinery such as a hand-held meat trimming knife or power operated meat skinning equipment to detect the touch of a bare or gloved human hand upon a conductive surface such as a rotating blade or a rotating feed mechanism in order to provide automated means for protective action against harm to an operator by immediately disconnecting the power drive means from the rotating element.

2. Background Information

Various types of tools have been devised for performing various operations such as power actuated drills, grinders, meat cutting and trimming tools, etc. which are operated by power drive means such as a chain or belt drive from the output shaft of an electric motor, a flexible drive shaft from an electric motor, a power drive shaft from an air motor, for supplying power to the device.

Of these various tools, hand-held power-driven meat cutting knives have been used extensively in the meat industry to facilitate the removal of meat from a carcass primarily in a trimming operation or from removing the meat remains from the bones. These devices are referred to as meat trimming knives and are electrically driven by a flexible drive shaft extending from a remotely mounted electric motor to a pinion gear in the handpiece which rotates an annular cutting blade, or by a pneumatic motor mounted within the handpiece in which the output shaft thereof is connected to the cutting blade by the pinion gear.

Examples of such electrically driven trimming knives using flexible drive shafts are shown in U.S. Pat. Nos. 3,291,010, 4,179,063, 4,178,683, 4,198,750, 4,494,311, and 4,575,938. An example of a pneumatically driven meat trimming knife is shown in U.S. Pat. No. 3,852,882.

Another type of machine used in the meat industry is referred to as a meat skinning machine which may be a floor mounted unit having a horizontally extending rotatable shaft on which is mounted a plurality of teeth located adjacent a skinning knife blade. An operator holds a piece of meat, such as a ham, and presses the meat against the rotating teeth which in combination with the blade removes the skin from the meat.

As with any power operated equipment there is always the danger that the hands or fingers of an operator will come into contact with the rotating knife blade of the hand-held trimming knife, or the rotating toothed feed shaft and adjacent cutting blade of a skinning machine. Therefore to ensure safety to the operator when operating such equipment, he or she will usually wear protective metal mesh gloves of the type shown in U.S. Pat. Nos. 4,384,449, 4,470,251 and 4,004,295. These gloves usually consist of a fine metal mesh covered with strands of a synthetic fiber. The metal mesh prevents or reduces the cutting of the operator upon contacting the cutting blade or toothed meat feed mechanism. Although these metal mesh gloves provide good protection to the operator and have been found to be quite satisfactory for reducing injury to the operator, it is still desirable to provide even greater protection to the operator in certain applications by providing a system which instantaneously removes the power drive source from the rotating element immediately upon contact of the operator's gloved hand with the element or certain other areas of the particular equipment being used by the operator.

Examples of other protective devices and systems for use in reducing injury to the operator are shown in U.S. Pat. No. 941,726, 3,785,230, 4,026,177, 4,391,358, and 4,621,300. Still other types of protective devices provide a mechanism attached to the hands of the operator which automatically pull the operator's hand away from the dangerous part of the equipment upon a certain even occurring. Examples of such safety equipment are shown in U.S. Pat. Nos. 2,978,084; 3,011,610; 3,047,116; 4,195,722; and 4,321,841. However, these safety systems require that the device be attached directly to the operator, requiring the operator to be secured to the equipment and be maintained at the work station.

Still another type of safety control system is shown in German Patent application Serial No. DE 35 01 021.

Although the safety control system of this German device may be satisfactory for certain applications, it requires the operator to remain constantly at the skinning machine or work station, preventing him or her from performing other tasks remote from the work station without first removing the metal gloves. Also, even after contact of the two electrically isolated components and immediate deenergizing of the electric drive motor, there will be some continued movement of the rotating cutting blade or feed roller due to inertia which will continue to draw the operator's gloved hand into the machine possibly causing minor injury. Another problem with this German device is that the machine can be energized and operated without the operator wearing the gloves since energization of the machine does not require the electrical control circuit to first sense the presence of the operator wearing the metal gloves.

It is also desirable in certain applications that the safety device be implemented with a particular meat trimming or skinning machine, but provides freedom of movement for the operator, enabling him or her to walk away from the machine and perform other tasks and then return to the machine without requiring the operator to reconnect directly to the machine by putting the metal gloves back on in order for the safety system to perform satisfactorily.

Therefore, the need exists for an improved safety control system which immediately disconnects the power drive source from a rotating metal component of a meat processing machine and causes reversal of the rotating component in certain applications to prevent injury to the operator upon a metal protective glove worn by the operator contacting the metal component, which provides freedom of movement of the operator from the processing machine by eliminating the need of direct and permanent attachment of the operator to the safety equipment of or component of the machine, and which prevents the machine from being energized unless the operator is wearing the protective metal gloves.

SUMMARY OF THE INVENTION

Objectives of the invention include providing an improved safety control system for power operated equipment and in particular for meat trimming knives and meat skinning machines which are driven by an electric or pneumatic drive source, and which has a rotating cutting blade or meat feed shaft which when contacted by an electric conductive glove worn by the operator immediately disconnects or reverses the power drive source from the rotating component to prevent injury to the operator.

A further objective of the invention is to provide such an improved control system in which the polarity of the electric drive motor for the rotating feed shaft of a skinning machine is reversed upon contact of the shaft of the metal glove of the operator to reverse the rotational movement of the shaft to prevent the gloved hand from being drawn into cutting contact with the adjacent skinning blade.

A still further objective of the invention is to provide such an improved control system in which the metal mesh gloves worn by the operator are electrically connected by wrist mounted electrodes and are connected to a safety switch portion of the control system by conductors to ensure good electrical contact between the mesh gloves and control system for disconnecting the power drive means from the rotating metal component upon contact of the rotating component by the gloved hand of the operator.

Another objective of the invention is to provide such an improved control system in which a manually operated switch is connected with the control system and must be actuated by the operator to start the power drive means; and in which the wrist electrodes must be in position on the operator's wrist before the power drive means can be actuated by the manually operated switch.

A still further objective of the invention is to provide such an improved control system in which the operator preferably wears moisture impervious dielectric gloves such as inexpensive disposable plastic gloves, over the electrical conductive gloves so that the moisture in a piece of meat being manipulated by the operator will not permit conductance of electric current between the metal mesh gloves and the isolated electrical component of the meat processing equipment thereby prematurely deactuating the power drive means from the rotating component until the rotating component is contacted by the gloved hand which immediately cuts through the thin plastic and engages the metal mesh in the glove to operate the safety switch means of the control system.

A still further objective of the invention is to provide such an improved control system in which a time delay circuit is incorporated into the control system to prevent premature reconnection of the power drive source to the rotatable component for a predetermined time period after disconnection of the power drive means by the safety switch means to ensure that the operator's hand is completely removed from contact with the rotating component or other electrically isolated portion of the equipment.

Another objective of the invention is to provide such an improved control system which can be used for a non-dedicated operator at the machine, providing freedom of movement of the operator from the machine to enable him or her to perform other jobs without requiring reconnection upon returning to the safety protected machine by enabling the safety control system to be operative by a metal contact pad attached to or worn by the operator contacting another metal component on the machine without requiring permanent or a temporary joined connection between the operator and the machine.

A further objective of the invention is to provide such an improved control system in which the operator is entirely electrically isolated from the machine by supporting the operator on a dielectric platform.

These objectives and advantages are obtained by the improved safety control system of the invention for use with power operated equipment; in which said system may be stated as including a reversible electric motor operatively connected to the metal component for rotating said component; control means for operatively connecting the motor to the rotating metal component; electrical conductive gloves adapted to be worn by an operator of the power operated equipment; and said control means further including safety switch means electrically connected to the conductive gloves and rotating metal component for reversing the direction of rotation of the motor and the direction of rotation of the rotating metal component to prevent injury to the operator if at least one of the operator's conductive gloves contacts the rotatable metal component.

BRIEF DESCRIPTION OF THE DRAWINGS

Preferred embodiments of the invention illustrative of the best modes in which applicants' have contemplated applying the principles, are set forth in the following description and are shown in the drawings and are particular and distinctly pointed out and set forth in the appended claims.

FIG. 7 is a diagrammatic perspective view showing the improved control system incorporated into a hand manipulated meat trimming knife electrically driven by an electric motor through a flexible drive shaft;

FIG. 8 is an enlarged fragmentary sectional view of the meat trimming knife taken on lines 8—8, FIG. 7;

FIG. 9 is a fragmentary view with portions broken away and in section, showing the connection of the flexible drive shaft of the meat trimming knife of FIGS. 7 and 8 with the electric drive motor;

FIG. 10 is a diagrammatic perspective view similar to FIG. 4, showing a second embodiment of the improved safety control system;

FIG. 11 is a diagrammatic side elevational view similar to FIG. 1 of the second embodiment of FIG. 10;

FIG. 12 is a fragmentary plan view showing the pivotal mounting of the pair of electrode contact arms mounted on the underside of the meat skinning machine with an alternate position shown in dot-dash lines.

FIG. 15 is a diagrammatic perspective view showing the mounting of a dielectric operator platform in raised position on the meat skinning machine;

FIG. 16 is a diagrammatic view similar to FIG. 15 with the platform being shown in a lowered operative position; and FIG. 17 is an enlarged fragmentary sectional view taken on line 17—17, FIG. 16.

Similar numerals refer to similar parts throughout the drawings.

DESCRIPTION OF THE PREFERRED EMBODIMENTS

Figure 1:
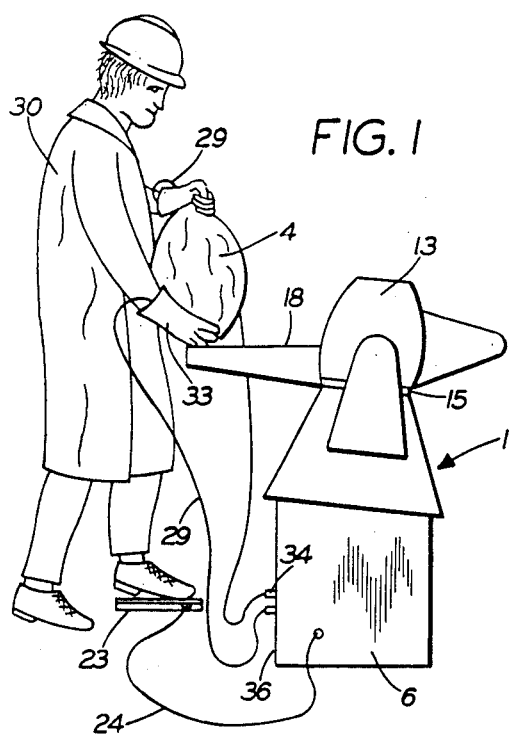
FIG. 1 is a diagrammatic perspective view showing the improved safety control system incorporated into a meat skinning machine.

The improved control system of the invention is shown diagrammatically in FIG. 1 in use with a meat skinning machine indicated generally at 1, of the type having a rotatable product feed shaft 2 (FIG. 3) on which is mounted a plurality of metal toothed wheels 3. Wheels 3 are angled in a direction which will draw the skin off of a piece of meat such as a ham 4, whereupon the skin is removed from the ham by an adjacent knife blade 5. Machine 1 may be of the type manufactured by GG di Grasselle & Co. S.N.C. of Albiena, Italy.

Figure 3:
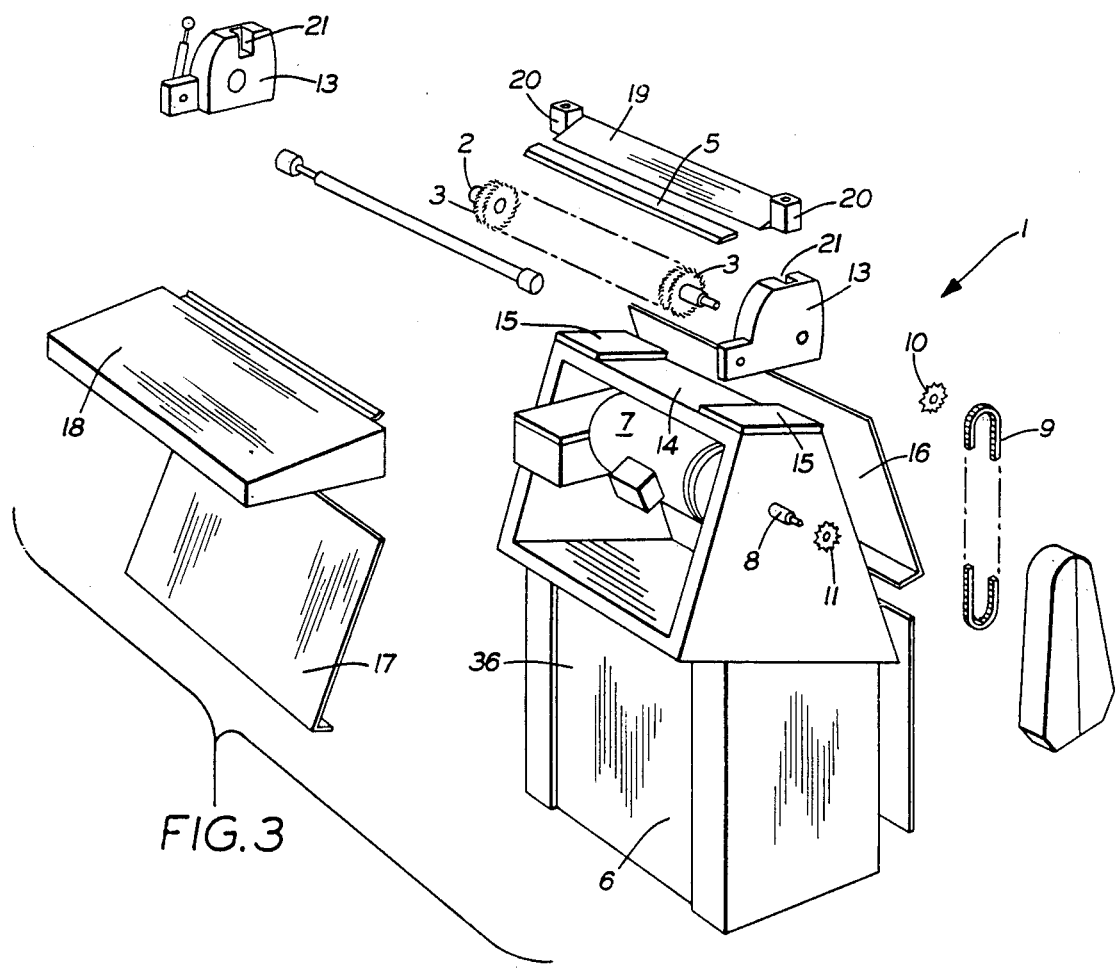
FIG. 3 is a fragmentary exploded diagrammatic view showing the major components of the meat skinning machine of the type shown in FIG. 1.

In addition to meat feed shaft 2 and knife blade 5, machine 1 will include a base 6 containing an electric drive motor 7, the output shaft 8 of which is connected to feed shaft 2 by a continuous drive chain 9, FIG. 3. Chain 9 extends between a pair of sprockets 10 and 11 which are connected to feed shaft 2 and motor shaft 8 respectively, for transmitting the drive power from motor 7 to rotatable shaft 2. Feed shaft 2 will be rotatably mounted by bearings (not shown) in adjustable space mounting brackets 13 which are mounted on top wall 14 of base 6 and are electrically insulated therefrom by a pair of dielectric pads 15. Motor shaft 8 is also electrically insulated from shaft 2 by forming either or both sprockets 10 and 11 of a dielectric material.

Figure 6:
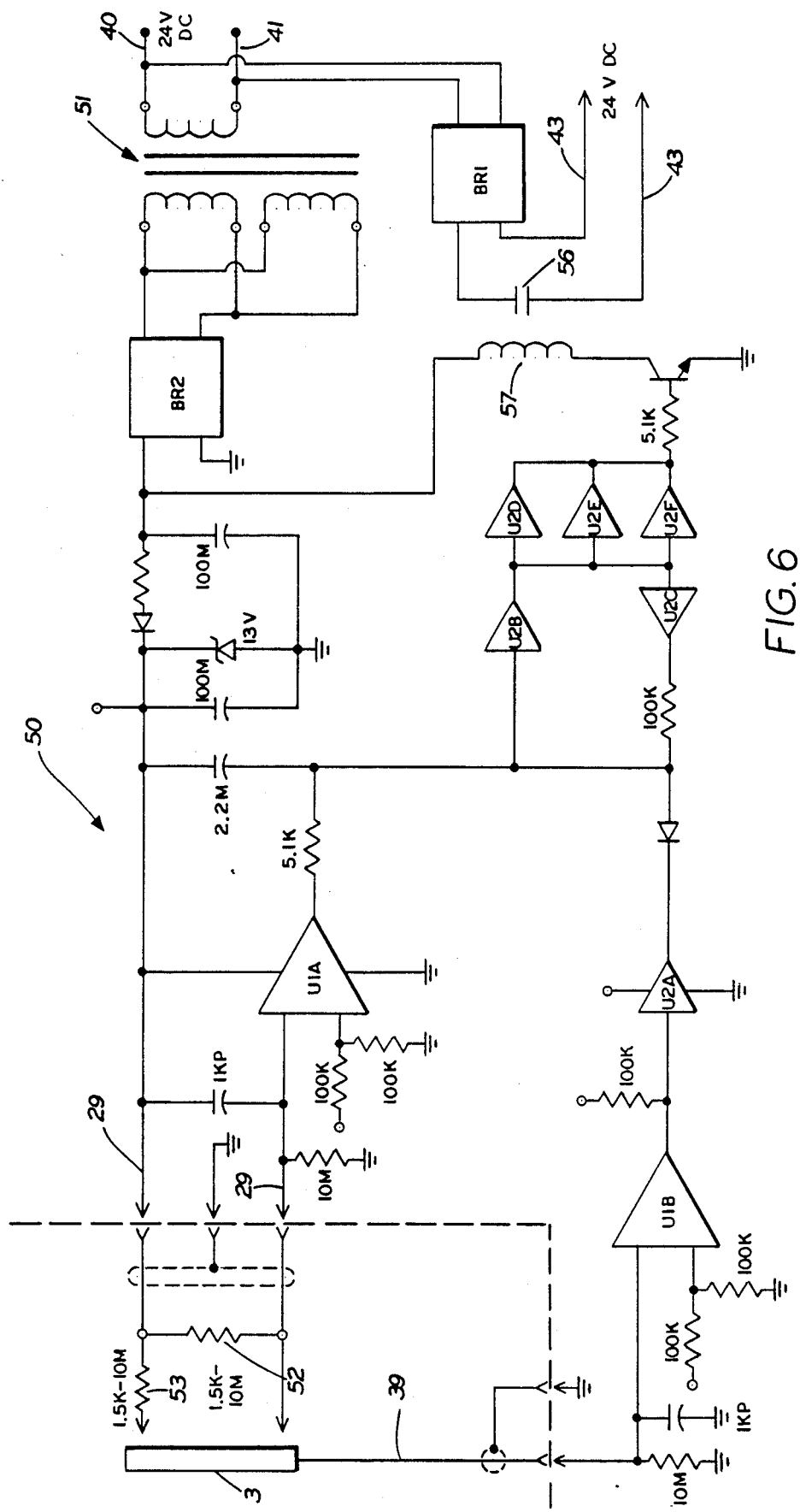
FIG. 6 is schematic wiring diagram of one type of safety control circuit for electrically connecting the operator's conductive gloves and the rotating metal component of the protected equipment to the power control circuit of FIG. 5.

Machine 1 further includes a protective rear housing shield 16, a front end panel 17 and a front shelf 18 for supporting the meat or ham 4 as the operator moves it forwardly into engagement with toothed feed wheel 3. Knife blade 5 is mounted in an adjustable position by a blade mounting strip 19 the ends 20 of which are received within adjusting slots 21 of brackets 13. A manually actuated foot switch 23 is connected by a conductor 24 (FIGS. 1 and 3) to the control circuitry as shown in FIG. 6. Actuation of foot switch 23 controls the actuation of drive motor 7 in a usual manner and is used during the normal operation of the skinning machine for stopping and starting the rotation of meat feed wheel 3 and shaft 2.

In accordance with one of the features of the invention a metal electrode 26 (FIG. 2) is mounted on a flexible wrist band 27 and is secured about the wrist of an operator by a Velcro type hook and pile fastening strip 28. Electrode 26 is connected by a conductor 29 to the control circuitry as described further below. An operator 30 will wear a knitted metal glove 31 which is finely woven of stainless steel and synthetic fiber which posses no electrical insulation between the stainless steel wire of the glove and the operator's hand, and which is electrically continuous from the point of contact with the safety system, namely the wrist, to the finger tips of the glove. These gloves will provide cut protection for the hand, and in addition will provide the electrical contact between the rotatable metal component of the equipment such as toothed feed wheel 3 when engaged thereby, and electrode 26. These gloves will have the stainless steel wire exposed and preferably will not be covered with nylon or other synthetic fibers as in prior metal mesh glove constructions which can effect electrical conductivity between the operator and the safety system.

Figure 4:
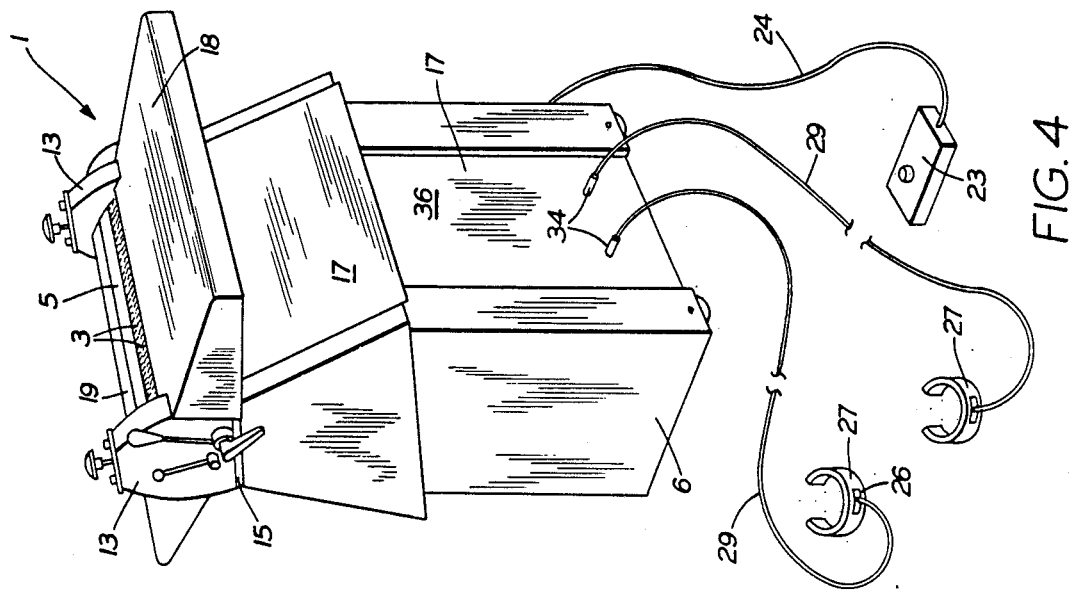
FIG. 4 is a diagrammatic perspective view of the meat skinning machine of FIGS. 1 and 3 including the wrist mounted operator electrodes.

When the control system is used in the particular application shown in FIGS. 1 and 4 wherein the operator is handling a piece of meat or other material having a large moisture content, an outer dielectric glove 33 is worn over the mesh metal glove to prevent current from being transmitted through the meat and electrically connecting the mesh metal gloves with the metal toothed drive wheel and actuating the safety control circuit. Glove 33 preferably is an inexpensive disposable plastic glove of relatively thin plastic sheet material. Wrist electrode 26 will be in direct contact with metal glove 31 or sufficiently close proximity to provide the necessary electrical communication for operation of the improved system.

Figure 5:
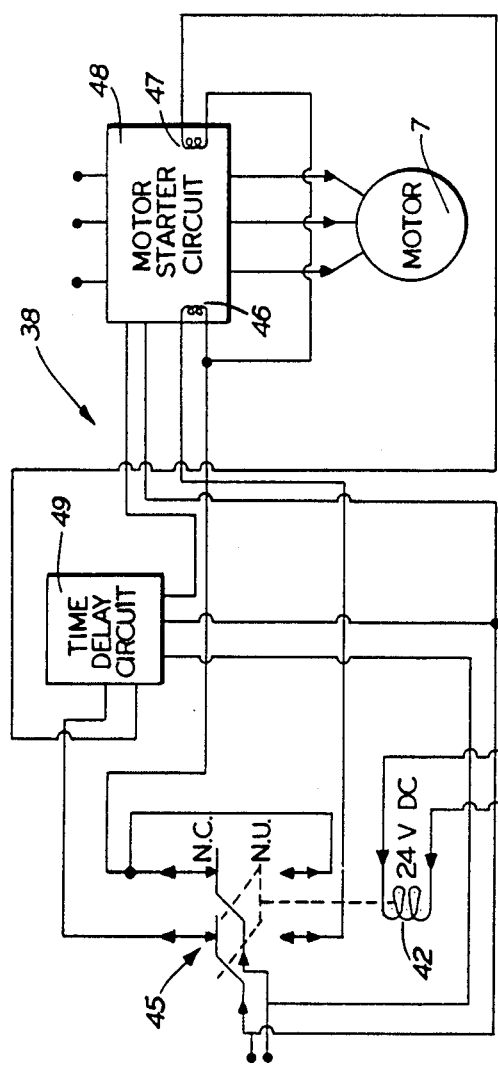
FIG. 5 is a schematic wiring diagram of one type of electrical control circuit for the improved control system of invention.
Figure 5:
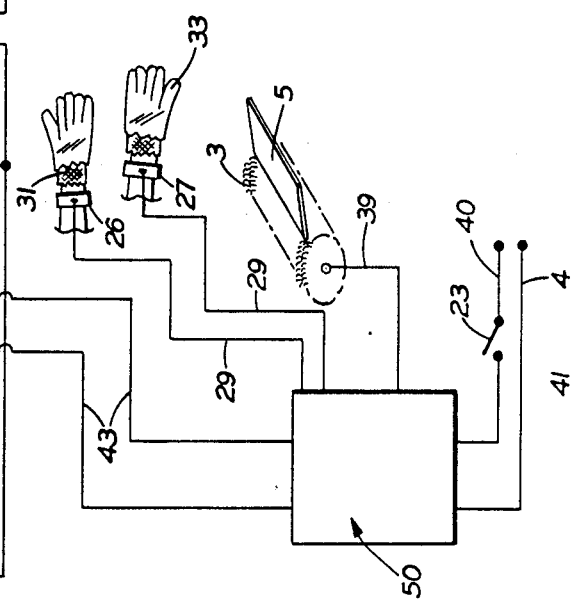

As shown in FIGS. 1 and 4 conductors 29 are connected by a jack plug 34 to a socket mounted in front panel 36 of meat skinning machine 1, which in turn is connected to a power drive control circuit 38 as described in detail below. One type of control circuitry which may be used with the improved control system is shown in FIG. 5. The particular circuitry is merely illustrative of one type and its particular mode of operation is easily understood by anyone skilled in the art and therefore is not described in complete detail. Furthermore various other types of circuits could be used than that shown in FIG. 5, without affecting the concept of the invention.

Control circuit 38 includes as elements, electrically isolated feed wheel 3, knife blade 5, blade mounting strips 19, mounting blocks 2C, and support shelf 18 which are electrically isolated by dielectric pads 15 from base 6 of skinning machine 1. These elements are diagrammatically represented in FIG. 5 by elements 3 and 5 and are electrically connected to a safety control circuit 50, which is shown in detail in FIG. 6 and described below, by a conductor 39.

Safety control circuit 50 is connected to a 120/240 AC power source by conductors 40 and 41, with manually actuated foot switch 23 being shown connected to a relay 42 by a pair of conductors 43. Relay 42 actuates a double-pole double-throw relay 45 which reverses the polarity of drive motor 7 by deenergizing forward motor coil 46 and energizing motor reverse coil 47 of a motor starter circuit 48. Actuation of relay 45 will actuate a relay in a time delay circuit 49 which will deenergize motor reverse coil 47 after approximately ½ second which will reverse the rotation of feed wheel 3 for approximately ¼ revolution. This reverse revolution of wheel 3 will automatically disengage the end of the operators glove from being trapped between the wheel and knife blade 5 further reducing the possibility of operator injury. Time delay circuit 49 will also prevent reenergizing of drive motor 7 for approximately 4 seconds requiring the operator to remove his foot from switch 23 before restarting motor 7. This ensures that the operator is completely free of any unwanted contact with the skinning machine.

Therefore, upon metal glove 31 contacting the electrically isolated machine component, whether it be feed wheel 3 after it cuts through dielectric plastic gloves 33, or upon metal glove 31 contacting knife blade 5, feed support shelf 18 or other part thereof, relay 45 will be actuated which will immediately reverse the polarity on drive motor 7. This will immediately rotate shaft 2 momentarily, preferably through an approximately one quarter revolution, afterwhich reverse coil 47 is deenergized by time delay circuit 49 completely deenergizing motor 7 and removing the power from rotatable shaft 2 and feed wheel 3 preventing any injury to the operator. This reverse motion of the shaft will "kick-out" any part of the operator's glove which has been drawn into or toward knife blade 5. Timing circuit 49 also will be programmed to require a predetermined time delay, i.e., four seconds before the foot switch 23 can be again depressed for energizing motor 7. Thus, once control circuit 38, in cooperation with safety circuit 50, has deenergized motor 7 upon one or both of the operator's metal glove 33 contacting an electrically isolated part of the skinning machine, the operator must disengage foot switch 23 and wait the predetermined delay time period before reactuating the foot switch. Again, the particular components and their relationship in control circuit 38 can vary without affecting certain aspects of the invention and is merely illustrative of one type of control circuitry which can be incorporated with safety circuitry 50 for achieving the improved safety control system. It is easily seen to anyone skilled in the art that other circuits could be utilized to achieve the same result.

The details of one type of safety circuit 50 which may be utilized is shown in FIG. 6, with the various portions thereof in common with that of control circuit 38 being indicated. Briefly, incoming power supply conductors 40 and 41 are connected to a transformer 51 with the 24 V DV output being applied across conductors 43 when relay 56 is actuated by coil 57. The electrically isolated component is diagrammatically represented by feed wheel 3, with the conductive metal gloves conductors 29 being connected across resistor 52. Resistor 53 represents the human body resistance of the operator's hand and must be sensed, that is, the operator must be wearing the protective metal mesh gloves and wrist electrodes, before machine 1 can be energized.

The remaining components of circuit 50 are merely illustrative of one type of circuit arrangement for achieving the actuation of relay 45 of circuit 38 (FIG. 5) by energizing relay coil 42 upon contact of metal glove 31 with any of the electrically isolated machine components. Again, the particulars of circuitry 50 can vary without effecting the concept of the invention.

The improved control system of the invention can also be incorporated into a hand manipulated meat trimming knife of the type shown in FIG. 7, and indicated generally at 65. Knife 65 is electrically driven and is of the type shown particularly in U.S. Pat. Nos. 4,324,043, 4,094,311 and 4,575,938. The particular electric knife construction shown in FIGS. 7 and 8 includes a tubular hand piece 66 which has an arcuate-shaped blade attachment 67 mounted on a front end thereof, for rotatably supporting a usual ring-shaped cutting blade 68. The blade is formed with a plurality of gear teeth 69 about the upper end which are in driving engagement with a pinion gear 70. Gear 70 is rotatably mounted within a sleeve bearing 71 seated in a front portion 72 of a main bore 73 which extends throughout handpiece 66. A grease reservoir 74 is mounted on tubular handpiece 66 and communicates with front bore portion 72 and contains a supply of edible grease which is discharged onto bearing sleeve 71 in a usual manner well known in the art.

A ferrule 75 which is of a usual tubular configuration formed with a through bore 76, is retained within the handpiece bore by a set screw 77. Also a threaded coupler 78 connects rear handle portion 79 with the front blade attachment portion 80.

The power for rotating blade 68 is supplied by a power supply line 81. Supply line 81 includes an interior flexible drive shaft 82 which is rotatably mounted and housed within an inner sleeve 83 formed of a dielectric material such as nylon, which is stabilized by a metallic braid 84 which is wrapped about sleeve 83. Drive shaft 82, dielectric sleeve 83 and braid 84 are all contained within an outer covering 85 of a food grade plastic material. Outer cover 85, braid 84, and dielectric sleeve 83 terminate at an annular stepped shoulder 86 of ferrel 75. Drive shaft 82 extends through ferrule bore 76 and terminates in a squared end 87 which extends into a complementary shaped opening 88 in the rear of pinion gear 70 and provides the driving connection between the drive shaft and cutting blade in a conventional manner.

The particular electric knife construction described above may vary without affecting the concept of the invention and is representative of a preferred type of flexible shaft driven knife. The other end of power supply line 81 is connected to an electric motor assembly indicated generally at 90, which is supported by bracket 91 generally above an operator's shoulder suspended from a ceiling or the like.

Referring to FIG. 9, the opposite end of power supply line 81 from knife 65 has a terminal connector indicated generally at 92, mounted thereon. Connector 92 has a cylindrical configuration and has a arcuate segment 93 embedded within the plastic material of connector 92 which is an electrical contact with metal braid 84. An alignment key 94 is molded integrally with terminal connector 92 and extends outwardly therefrom for positioning the end of power supply line 81 within the end of motor assembly 90.

Motor assembly 90 is of a usual construction having an outer housing 96 and a housing cover 97 which contains an electric drive motor 95. Motor 95 is connected to a usual source of electric power, preferably 120/240 volts AC, by an electric line 98. Output shaft 100 is connected through a pair of gears 101 and 102 and an electrically operated clutch 103 to a stub shaft 104 by a second pair of gears 105 and 106. Gear 106 is secured to stub shaft 104 and is constructed of a suitable dielectric material such as nylon, to prevent electrical contact between shaft 104 and the housing wall 107. The particular size and arrangement and gears may vary depending upon the particular output speed of motor 95 and the desired rotational speed to be transferred to drive shaft 82.

Drive shaft 82 extends beyond connector 92 and into compartment 108 and into an opening formed in a terminal block 110 which is rigidly mounted on the end of stub shaft 104. A spring biased ball detent 111 is mounted within block 110, with the ball thereof being engaged with flexible shaft 82 to maintain the shaft in a tight abutting relationship with the surrounding wall of the terminal block opening to ensure a solid electrical contact between metal terminal block 110 and flexible shaft 82.

Terminal connector 92 of power supply line 81 is secured in an end bell 113 of the motor housing by alignment key 94 which is slip-fitted within a complimentary shaped slot 115 formed in the end bell. A thumb screw 116 is engaged with arcuate contact segment 93 to provide a good electrical contact between the segment and with metal braid 84. Clutch 103 is referred to as an electric clutch and brake and may be of the type identified as Model No. SOFSB26 manufactured and distributed by Inertia Dynamics of Collinsville, Conn. Other types of clutches well known in the art can also be used if desired.

The clutch is connected by electric conductors 117 to safety control circuitry 50 as are output conductors 43 as shown in FIGS. 5 and 6. Stub shaft 104 is electrically connected to safety control circuit 50 by a commutator brush 120 which is maintained in engagement with the stub shaft by a spring 121. Brush housing 122 is electrically insulated from the gear housing. Brush 120 is connected by a conductor 123 to circuitry 50 in the same manner as is conductor 39 of skinning machine 1 as shown in FIGS. 5 and 6, and provides the electrical connection to the electrically isolated portion of the handpiece, namely cutting blade 68 and blade attachment 67. As shown in FIG. 8 the flexible drive shaft is electrically connected to the pinion gear and to the cutting blade, since all of these components are metal. The front end attachment portion of the handpiece is also metal and the rear handle portion thereof may be a nylon or other dielectric material.

As shown in FIG. 7, the operator will also use dielectric plastic gloves 33 over the metal gloves to ensure insulation from the handpiece as well as from the meat being trimmed. The meat usually is held by one hand as the other hand manipulates the knife and cutting blade over the meat in a usual trimming operation. As shown in FIG. 7 upon the operator's hand contacting cutting blade 68, the blade will immediately cut through the thin plastic dielectric glove 33 and contact metal glove 31. This contact immediately disengages motor output shaft 100 from flexible drive shaft 82 through a safety control circuit 50, in a similar manner as discussed above with respect to skinning machine 1, by operating clutch 103.

The inertia of the rotating mass for knife 65 consists principally of drive shaft 82 and rotating blade 68, all of which are relatively small. Therefore, almost instantaneously upon disengagement of the drive shaft through clutch 103, the blade will cease rotation preventing possible injury to the operator. Motor assembly 90 will have a usual manually actuated switch, (not shown) similar to the manually actuated foot switch 23 of skinning machine 1 to energize motor 95 in a usual manner.

Although the above described safety control system is indicated for use with an electrically driven meat trimming knife, the same principles can be incorporated into a pneumatically driven knife having a pneumatic control and valve of the type shown in U.S. Pat. No. 4,794,273. In the pneumatic actuated trimming knife, actuation of a pneumatic clutch in the same manner as clutch 103, will deenergize the pneumatic motor to stop rotation of the cutting blade.

The operator of hand held knife 65 will wear the same metal electrodes 26, with conductors 29 thereof being are connected to the safety control circuit 50 as discussed above with respect to skinning machine 1.

Another embodiment of the improved safety control system is shown particularly in FIGS. 10–14. This embodiment is similar in many respects to that disclosed above with respect to meat skinning, machine 1 and is adapted for use with the same type of skinning machine. However, this embodiment enables the operator to be a non-dedicated operator, that is, the operator can easily walk away from the machine and preform other tasks without requiring him or her to remove and replace the conductive electric gloves 31 and dielectric plastic gloves 33 each time he or she walks away from and returns to skinning machine 1.

To achieve this non-dedicated operator arrangement, skinning machine 1 (FIG. 10) is provided with a pair of electrically isolated conductive metal arms 125 and 126 which are connected to the safety control circuits as described above, by conductors 127 and 128, respectively. Arms 125 and 126 are pivotally mounted on an undersurface 129 of machine shelf 18 by a pair of dielectric, preferably food-grade nylon dielectric posts 130. Posts 130 electrically isolate arms 125 and 126 from metal shelf 18.

The inner or pivotal ends 137 of the conductive metal arms which are formed of a dielectric material, are connected to each other by a pair of links 131 and 132, which are adjustably joined by an adjusting link 134 and a pair of bolts 135 which extend through adjustment slots 136. The other end of links 131 and 132 are pivotally connected to the pivotal ends of arms 125 and 126 by pins 138. This arrangement enables arms 125 and 126 to move in unison once secured in their adjusted position and are adjustable to accommodate operators of various sizes as shown by the partial dot-dash lines in FIG. 12, by use of clamping bolts 135 and slots 136. Arm ends 137 and posts 130 electrically isolate arms 125 and 126 from the other components of machine 1.

A pair of curved metal contact plates 140 and 141 are pivotally mounted on the extended ends of conductive arms 125 and 126, respectively, and together with the arms, form a pair of electrodes which are engageable with a second pair of electrodes indicated generally at 142 and 143. Electrodes 142 and 143 are mounted on a garment 145 (FIGS. 11, 13 and 14) which is worn by an operator of meat skinning machine 1.

Figure 13:
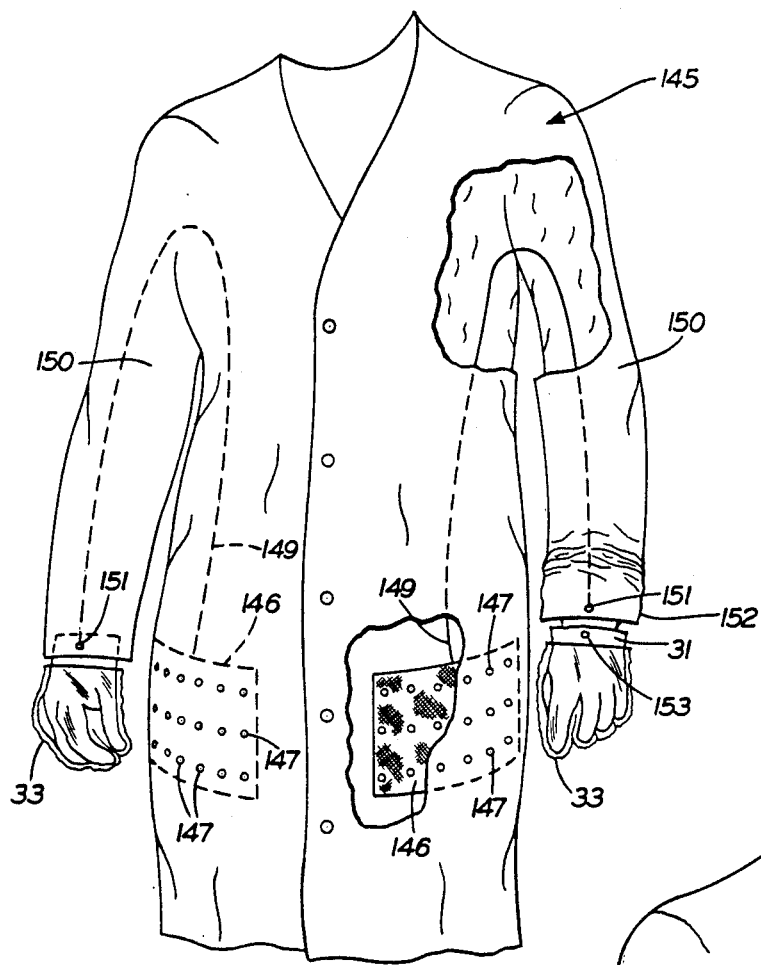
FIG. 13 is a diagrammatic perspective view with portions broken away, showing the mounting of the electrode pad and connecting wires incorporated into a garment adapted to be worn by the operator of the meat skinning machine.

Referring to FIG. 13, a first type of second electrodes 142 and 143, each consists of a metal mesh pad 146 which is sewn on the inside of garment 145. Pads 146 are provided with a plurality of metal contact buttons 147 which extend through the fabric of garment 145 and are located on the exterior of the garment and provide an electrical connection between buttons 147 and mesh pads 146. Each pad 146 is connected to an electrical conductor 149 which preferably is located within the lining of garment 145 and extends along the upper portion of the garment and along the garment arm 150 also within the interior lining thereof, terminating in a contact button or metal snap 151 at the cuff area 152 of the garment. A similar metal button or snap 153 is mounted on the cuff area of each electrical conductive metal glove 31 for releasable engagement with garment snap 151. The operator preferably will wear dielectric plastic gloves 33 over metal gloves 31 to prevent conducting of the electricity through the meat, especially when the piece of meat contains a considerable amount of moisture.

The mesh metal electrode pads 146 which are mounted on each side of garment 145 preferably adjacent the upper thigh areas of the operator, enable the operator to merely approach machine 1 and contact mesh pads 146 with arm electrode plates 140 and 141 as shown in FIG. 11. This contact places the safety control circuit in operation without requiring the metal mesh gloves to be connected to equipment 1 by conductors 29 and jack plugs 34 as shown in FIG. 1 of the first embodiment. Thus, the operator upon connecting glove snaps 153 with garment snaps 151, one of which is shown connected and the other disconnected in FIGS. 13 and 14, merely approaches skinning machine 1 and contacts electrode contact plates 140 and 141 and upon depressing manually actuated foot switch 23, can begin the operation of the equipment.

The remaining function of the equipment is generally similar to that described above with respect to the first embodiment, that is, upon the metal gloves contacting any of the electrically isolated parts of the machine, the motor will reverse itself to reverse the toothed feed shaft 2 or other rotatable metal component.

Time delay circuit 49 (FIG. 5) will provide for an "operator sense cycle" and will maintain the system energized for approximately one and one-half seconds should the operator break contact between one or both of the electrode pads 146 and curved metal contact plates 140 and 141. This prevents accidental deenergizing of the control system upon momentary relaxing or movement of the operator away from the electrode arms 125 and 126. Also the operator must be wearing garment 145 and gloves 31 to permit the machine to be energized thereby preventing the operator from disregarding this safety control and operating the machine without first complying with these safety features.

Figure 14:
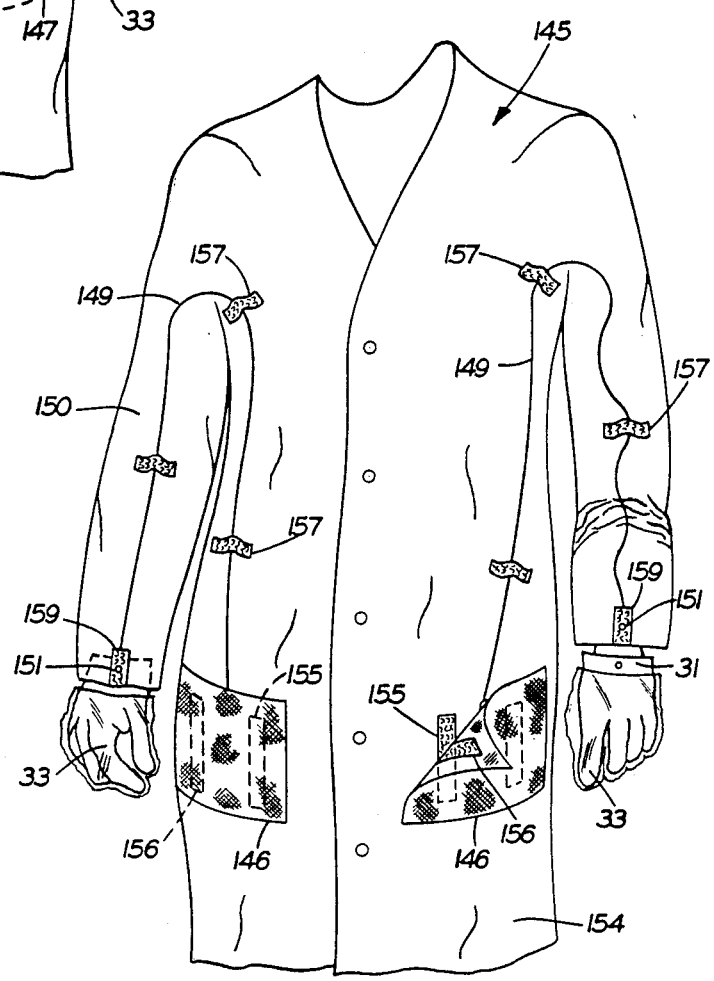
FIG. 14 is a diagrammatic perspective view similar to FIG. 13, showing the removable mounting of the electrode pad and connecting wires externally on the operator's garment.

A modified form of garment 145 is shown in FIG. 14 in which the second electrodes 142 and 143, and in particular metal mesh pads 146, are mounted on exterior 154 of garment 145 preferably by strips of hook and pile fabrics 155 and 156, commonly known under the trademark Velcro. This releasable mounting of the pads enable the pads be removably attached and removed from the garment enabling the garment to be cleaned, afterwhich the electrode pads are reapplied easily by joinder of fabric strips 155 and 156. Conductors 149 extend along the exterior of the garment and are removably mounted thereon by similar Velcro strips or loops 157 which extend along the arms of the garment, instead of being formed as a permanent part of the garment in the interior lining thereof as shown in FIG. 13. Conductors 149 terminate at snaps 151 which also are mounted on pieces of removably attached Velcro 159.

The operation of this externally mounted electrode system is the same as that discussed above with respect to FIG. 13, except that pads 146 directly contact curved metal plates 140 and 141 and do not require the use of contact buttons 147 as in the embodiment shown in FIG. 13. The principle advantage of the embodiment of FIG. 14 is that the electrodes and associated conductors can be easily removed from the garment and replaced after the garment has been cleaned.

It is readily understood that other types of garments can be devised which achieve the same purpose as garment 145. For example, wrist bands 27 can be attached to a harness type garment (not shown) by electrical conductors and then releaseably connected to an electrical input jack on the machine by a coaxial conductor or cable. This enables the operator to disconnect easily from the machine if desired for performing other tasks and then reconnecting by the jack connector.

In summary, meat skinning machine 1 and hand held meat trimming knife 65, are the two preferred embodiments of the invention. Each of these devices has a power drive means which connects the rotatable metal component, namely metal feedwheel 3 and cutting blade 68, and a control means for connecting the power drive means to the rotating metal component, which metal component is electrically isolated from the metal gloves of the operator. Also both of these devices includes a safety circuitry 50 which electrically connects the conductive gloves 31 to the rotatable metal component for disconnecting the power drive means from the metal component to prevent injury to the operator if at least one of the operator's conductive gloves or other part of the operator's body contacts the rotatable metal component or other electrically isolated components.

As discussed above, contact of the operator's metal glove or other part of the operator's body with other parts of the electrically isolated equipment such as the feed wheel mounting brackets and meat support shelf 18 of skinning machine 1, or blade attachment portion 67 or front portion 80 of the handpiece will also disconnect the power drive means from the meat feed wheel and cutting blade, respectively.

Another modification to the improved meat skinning machine is shown in FIGS. 15–17. In this embodiment, a dielectric operator support platform indicated generally at 160, is pivotally mounted by a pair of hinges 161 on front panel 36 thereof and is shown in a raised position in FIG. 15 and in a lowered operative position in FIG. 16. Platform 160 preferably is a one-piece molded plastic member having a generally rectangular configuration and is adapted to be supported in its lowered position by a pair of feet 162 molded on the undersurface of the platform.

Preferably a water drip edge 164 (FIG. 17) extends about the three sides of the platform to prevent water from bridging from the platform to the floor along the sidewalls 165 which are formed integrally with and extend downwardly from the top supporting wall portion 166.

Preferably when in the raised position as shown in FIG. 15, the outward length of the platform will not cover a manually operated switch 168 which may be mounted on some types of skinning machines 1, eliminating the use of foot switch 23.

Dielectric platform 160 eliminates the need of electrically isolating certain portions of the machine by the use of dielectric pads 15 as shown particularly in FIGS. 3 and 4, and also eliminates the use of nylon drive gears or sprockets 10 and 11 (FIG. 3). With the use of platform 160 the operator is electrically isolated from the entire skinning machine 1 and should the operator touch any of the metal components of the machine, it will deenergize or reverse the rotation of the drive motor and the rotating metal member driven thereby.

Figure 2:
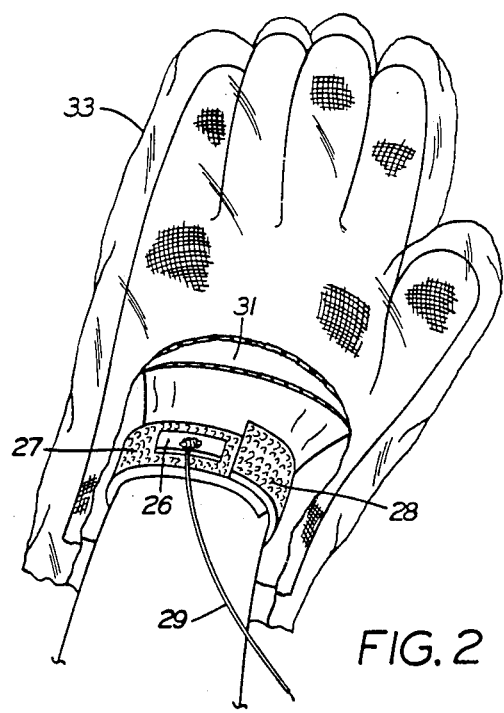
FIG. 2 is an enlarged diagrammatic perspective with portions broken away showing connection of the wrist electrode to the operator's hand in combination with the mesh metal gloves and outer dielectric plastic gloves.

The use of platform 160 has been useful for those machines in which a build-up of meat and other materials could possibly cause an electrical path between the metal components of machine 1 heretofore separated by dielectric pads 15. Although the machine would continue to function if dielectric pads 15 are shorted out, the control circuit may not be as effective. Since the machine is electrically grounded, the operator therefore is completely electrically isolated from the machine and other electrically grounded elements when standing upon platform 1 with the safety control circuit being operative by the use of the wrist attached electrodes as shown in FIG. 2, or by the use of the protective garment as shown in FIGS. 10-14.

Another important feature achieved by the use of dielectric platform 160 is that it can be retrofitted easily onto existing skinning machines without requiring the machine to be disassembled and equipped with dielectric pads 15 and dielectric drive sprockets 10 and 11. This reduces considerably the cost of retrofitting existing skinning machines for use with the improved control system of the invention.

Accordingly, the safety control system is simplified, provides an effective, safe, inexpensive, and efficient system which achieves all the enumerated objectives, provides for eliminating difficulties encountered with prior systems, and solves problems and obtains new results in the art.

In the foregoing description, certain terms have been used for brevity, clearness and understanding; but no unnecessary limitations are to be implied therefrom beyond the requirements of the prior art, because such terms are used for descriptive purposes and are intended to be broadly construed.

Moreover, the description and illustration of the invention is by way of example, and the scope of the invention is not limited to the exact details shown or described.

Having now described the features, discoveries and principles of the invention, the manner in which the safety control system for power operated equipment is constructed and used, the characteristics of the improved system, and the advantageous, new and useful results obtained; the new and useful structures, devices, elements, arrangements, parts, and combinations are set forth in the appended claims.

We claim:

1. A safety control system for power operated equipment of the type having a rotating metal component including:
    (a) a reversible electric motor operatively connected to the metal component for rotating said component;
    (b) control means for operatively connecting the motor to the rotating metal component;
    (c) electrical conductive gloves adapted to be worn by an operator of the power operated equipment;
    (d) moisture impervious dielectric gloves adapted to be worn by the operator over the electrical conductive gloves; and
    (e) said control means further including safety switch means electrically connected to the conductive gloves and rotating metal component for reversing the direction of rotation of the motor and the direction of rotation of the rotating metal component to prevent injury to the operator if at least one of the operator's conductive gloves contacts the rotatable metal component.

2. The control system defined in claim 1 in which an electrode is attached to each of the operator's wrists and is electrically connected by conductors to the safety switch means and is in close proximity to the conductive gloves for electrically connecting said gloves to the safety switch means.

3. The control system defined in claim 1 in which the control means includes a manually actuated operator control switch for operatively connecting the electric motor to the metal component for rotating said component.

4. The control system defined in claim 3 in which the control means includes means for preventing energizing of the electric motor by the manually actuated operator control switch unless the electrical conductive gloves are being worn by the operator.

5. The control system defined in claim 1 in which the metal component is a shaft having a plurality of teeth mounted thereon for removing skin from a piece of meat in a meat skinning machine.

6. The control system defined in claim 5 in which the shaft is rotated in the reverse direction for less than one complete revolution upon contact of at least one of the conductive gloves or other part of the operator's body with the rotatable metal component.

7. The control system defined in claim 1 in which the control means includes a time delay circuit to prevent reconnection of the electric motor to the rotatable metal component for a predetermined time period after disconnection of the electric motor by the safety switch means.

8. The control system defined in claim 4 in which the meat skinning machine further includes a base and brackets for rotatably mounting the shaft on said base; and in which the brackets are electrically insulated from the base by intervening pads of a dielectric material and are electrically connected to the rotating metal component whereby contact of said brackets by at least one of the conductive gloves prior to contact with said rotating metal component also will operatively disconnect the electric motor from said metal component.

9. The control system defined in claim 1 in which the conductive gloves include stainless steel wires externally exposed for direct contact with the rotatable metal component and internally exposed for direct contact with the operator's hand to provide continuous electrical contact between said metal component and the safety switch means upon contact of at least one of the conductive gloves with said metal component.

10. The control system defined in claim 1 including dielectric platform means for supporting the operator and for electrically isolating said operator from the power operated equipment and from other electrically grounded elements.

11. The control system defined in claim 1 in which first electrode means externally exposed on a lower portion of a garment adapted to be worn by an operator of said equipment contacts second electrode means projecting outwardly from said equipment for electrically connecting the conductive gloves to the safety switch means.

12. A safety control system for power operated equipment of the type having a rotating metal component including:
    (a) a reversible electric motor operatively connected to the metal component for rotating said component;

(b) control means for operatively connecting the motor to the rotating metal component;

(c) electrical conductive gloves adapted to be worn by an operator of the power operated equipment;

(d) said control means further including safety switch means electrically connected to the conductive gloves and rotating metal component for reversing the direction of rotation of the motor and the direction of rotation of the rotating metal component to prevent injury to the operator if at least one of the operator's conductive gloves contacts the rotatable metal component; and (e) first electrode means externally exposed on a lower portion of a garment adapted to be worn by an operator of said equipment for contacting second electrode means projecting outwardly from said equipment for electrically connecting the conductive gloves to the safety switch means.

13. The control system defined in claim 12 in which the first electrode means is a pair of metal mesh pads mounted on the garment and located adjacent the thighs of the operator when the garment is worn by the operator.

14. The control system defined in claim 12 in which each of the mesh pads are connected to a respective one of the conductive gloves by an electrical conductor extending along a respective arm of the garment and terminating in a connector at a cuff area of the garment.

15. The control system defined in claim 12 in which the second electrode means is a pair of electrical conductive arms pivotally mounted on the power operated equipment.

16. The control system defined in claim 12 in which the control means includes a time delay circuit to maintain the electric motor energized for a predetermined time period after the first and second electrodes are moved out of contact with each other.

17. A safety control system for power operated equipment of the type having a rotating metal component including:

(a) an electric motor operatively connected to the metal component for rotating said component;

(b) control means for operatively connecting the motor to the metal component for rotating said component;

(c) electrical conductive gloves adapted to be worn by an operator of said equipment;

(d) said control means including safety switch means electrically connected to the conductive gloves; and (e) first electrode means externally exposed on a garment adapted to be worn by an operator of said equipment for contact with second electrode means projecting outwardly from said equipment for electrically connecting the conductive gloves to the safety switch means.

18. The control system defined in claim 17 in which the first electrode means is a pair of metal mesh pads mounted on the garment adapted to be located adjacent the thighs of the operator when the garment is worn by the operator.

19. The control system defined in claim 18 in which each of the mesh pads are connected to a respective one of the conductive gloves by an electrical conductor extending along a respective arm of the garment and terminating in a connector at a cuff area of the garment.

20. The control system defined in claim 19 in which each of the conductive gloves is provided with a connector adapted to be releasably engaged with the connector in the garment for electrically connecting the mesh pads to the conductive gloves.

21. The control system defined in claim 19 in which the mesh pads and electrical conductors are removably attached to the garment.

22. The control system defined in claim 21 in which the mesh pads and electrical conductors are removably attached to the garment by hook and pile fabrics.

23. The control system defined in claim 19 in which the mesh pads are located internally of the garment and are externally exposed by a plurality of conductive buttons connected to the pads and projecting through the garment.

24. The control system defined in claim 17 in which the second electrode means is a pair of electrical conductive arms pivotally mounted on the power operated equipment.

25. The control system defined in claim 24 in which a curved metal contact plate is mounted on an extended end of each of the conductive arms for engagement with the mesh pads on the operator's garment.

26. The control system defined in claim 25 in which pivotally mounted ends of the conductive arms are connected by a link so that said arms move in unison.

27. The control system defined in claim 24 in which the conductive arms are pivotally mounted on dielectric pivot posts electrically isolating said arms from the power operated equipment.

28. The control system defined in claim 17 in which the control means includes a time delay circuit to maintain the electric motor energized for a predetermined time period after the first and second electrode means are moved out of contact with each other.

29. The control system defined in claim 17 in which the control means includes means for preventing the electric motor from being energized unless the first and second electrodes are in contact with each other and the conductive gloves are being worn by the operator.

30. The control system defined in claim 17 including dielectric platform means for supporting the operator and for electrically isolating said operator from the power operated equipment and from other electrically grounded elements.

31. A safety control system for an electrically driven knife of the type having a handpiece with an annular rotatable cutting blade driven by a flexible drive cable which is driven by an electric motor located remote from the handpiece, said control system including:

(a) control means having a clutch for connecting the flexible drive cable to an output shaft of the electric motor;

(b) electrical conductive gloves adapted to be worn by an operator of the handpiece;

(c) safety switch means electrically connected to the conductive gloves and cutting blade for disengaging the clutch to stop rotation of the cutting blade by the drive cable if at least one of the operator's conductive gloves contacts the cutting blade of the handpiece; and (d) moisture impervious dielectric gloves adapted to be worn by the operator over the electrical conductive gloves.

32. A safety control system for power operated equipment of the type having a rotating metal component including:

(a) an electric motor operatively connected to the metal component for rotating said component;

(b) control means for operatively connecting the motor to the metal component for rotating said component;

(c) electrical conductive gloves adapted to be worn by an operator of said equipment;

(d) said control means including safety switch means electrically connected to the conductive gloves; and (e) electrical conductor means on a garment adapted to be worn by an operator for releaseably electrically connecting the conductive gloves with the safety switch means.

33. A safety control system for power operated equipment of the type having a rotating metal component including:

(a) a reversible electric motor operatively connected to the metal component for rotating said component;

(b) control means for operatively connecting the motor to the rotating metal component;

(c) electrical conductive gloves adapted to be worn by an operator of the power operated equipment;

(d) said control means further including safety switch means electrically connected to the conductive gloves and rotating metal component for reversing the direction of rotation of the motor and the direction of rotation of the rotating metal component to prevent injury to the operator if at least one of the operator's conductive gloves contacts the rotatable metal component; and (e) dielectric platform means for supporting the operator and for electrically isolating said operator from the power operated equipment and from other electrically grounded elements.

* * * * *